W. V. TURNER.
ENGINEER'S BRAKE VALVE DEVICE.
APPLICATION FILED MAY 24, 1911.
1,016,186.
Patented Jan. 30, 1912.
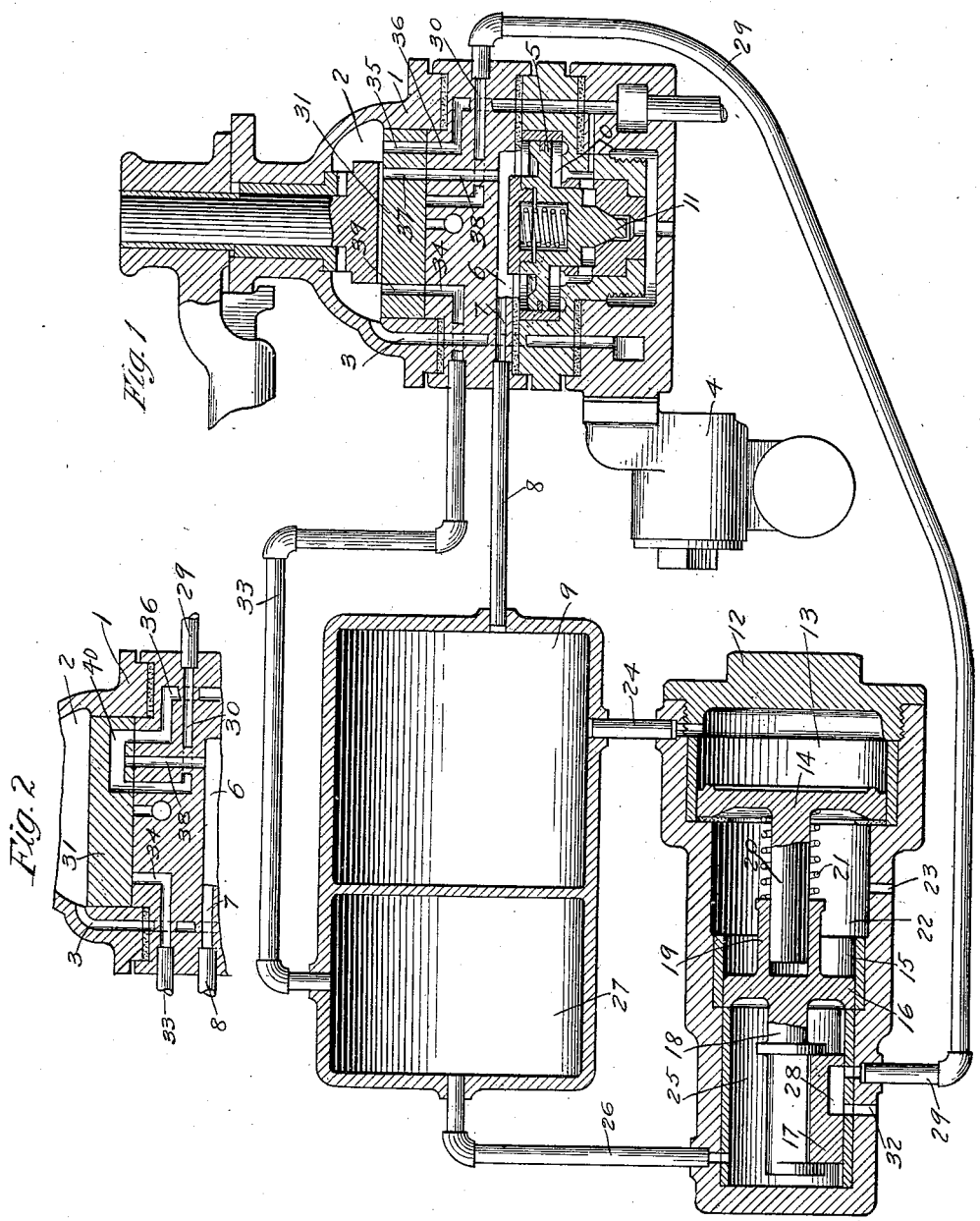

UNITED STATES PATENT OFFICE.

WALTER V. TURNER, OF EDGEWOOD, PENNSYLVANIA, ASSIGNOR TO THE WESTINGHOUSE AIR BRAKE COMPANY, OF PITTSBURGH, PENNSYLVANIA, A CORPORATION OF PENNSYLVANIA.

ENGINEER'S-BRAKE-VALVE DEVICE.

1,016,186.  Specification of Letters Patent.  Patented Jan. 30, 1912.

Application filed May 24, 1911. Serial No. 629,197.

*To all whom it may concern:*

Be it known that I, WALTER V. TURNER, a citizen of the United States, residing at Edgewood, in the county of Allegheny and State of Pennsylvania, have invented new and useful Improvements in Engineer's-Brake-Valve Devices, of which the following is a specification.

This invention relates to fluid pressure brakes, and more particularly to a brake valve device of the type having an equalizing discharge valve mechanism for controlling the exhaust of air from the train pipe.

It has heretofore been proposed to employ a brake valve device of the above character having a direct exhaust port adapted in making a service application of the brakes to vent air directly from the train pipe in addition to the air vented from the train pipe by the action of the equalizing discharge valve mechanism, and in order to limit the maximum reduction in train pipe pressure which may be made in a service application of the brakes, means are provided for closing the direct exhaust and the release of air from the equalizing reservoir upon reduction in equalizing reservoir pressure to a predetermined degree by equalization into a closed chamber.

As is well known, when fluid under pressure equalizes from one receptacle into another through an orifice of limited size, the rate of flow becomes gradually slower as the point of equalization is approached and as a consequence, the time required to make a given reduction in train pipe pressure is somewhat greater than need be.

The principal object of my present invention is to provide a brake valve device having means for automatically limiting the maximum reduction in train pipe pressure to a predetermined degree and adapted to effect such reduction in less time than heretofore required.

In the accompanying drawing; Figure 1 is a sectional view of a brake valve device embodying my invention and showing the parts in normal running position and Fig. 2 a sectional view of a portion of the brake valve, showing the rotary valve in service application position.

As shown in the drawing, the brake valve device may be of the usual type comprising a case 1 having a valve chamber 2 containing a rotary valve 31 and connected to passage 3 through which fluid is supplied to the valve chamber by a feed valve device 4 and a piston chamber containing an equalizing piston 5, subject on one side to the pressure of a chamber 6 connected by passage 7 and pipe 8 to the equalizing reservoir 9 and subject on the other side to the pressure of chamber 10 which is open to the train pipe. The piston 5 is adapted to operate an equalizing discharge valve 11 for venting air from the train pipe in making an application of the brakes.

According to my improvement, a valve device is provided comprising a casing 12 having a piston chamber 13 containing a piston 14, a piston chamber 15 containing a smaller piston 16, and a slide valve 17 adapted to be operated by the piston stem 18 of the piston 16. The piston 16 is provided with a hub 19 having a socket within which the end of piston stem 20 is carried and a spring 21 is interposed between the end of the hub 19 and the piston 14.

The chamber 22 intermediate the pistons 14 and 16 is open to the atmosphere through a port 23 and the piston chamber 13 communicates through pipe 24 with the equalizing reservoir 9. The valve chamber 25 at the outer face of piston 16 communicates through a pipe 26 with a chamber 27. The valve 17 is provided with a cavity 28 adapted in the normal position of the piston 16 to connect pipe 29 and passage 30 leading to the seat of the rotary valve 31 with an exhaust port 32.

Chamber 27 is connected by pipe 33 to a passage 34 leading to the seat of the rotary valve 31.

In the running position of the brake valve, as shown in Fig. 1 of the drawing, a through port 35 in the rotary valve 31 registers with passage 36 leading to the train pipe, so that fluid is supplied to charge up and maintain the train pipe at normal pressure. Through port 37 in the rotary valve also registers with passage 38 opening into chamber 6 and thus the equalizing reservoir is charged to normal pressure through passage 7. A third through port 39 registers in running position with passage 34, so that the chamber 27 and valve chamber 25 are charged to the standard train pipe pressure.

The piston chamber 13 is charged with fluid under pressure from the equalizing reservoir 9 through pipe 24, and since the opposite side of piston 14 is subject to atmospheric pressure, said piston assumes its inner seated position. Piston 16 is held to its seated position by the spring 21, the resistance of which exceeds the air pressure in chamber 25 acting on the opposite side of the piston.

The seating of both pistons is desirable, so as to prevent possible leakage from the piston chamber 13 and the valve chamber 25 to the chamber 22 which is subject to atmospheric pressure. In order to insure the seating of both pistons, I prefer to employ the construction shown, which permits of the independent seating of each piston. If the pistons were integrally connected, there might be some difficulty in securing sufficient mechanical accuracy of construction to always insure the seating of both pistons.

When the brake valve is turned to service application position, as shown in Fig. 2 of the drawing, ports 36 and 38 are connected by cavity 40 in the rotary valve 31 with passage 30, so that fluid under pressure is vented from the equalizing reservoir 9 and directly from the train pipe through pipe 29, cavity 28 in valve 17, and exhaust port 32. If the brake valve is left in service application position, air continues to flow from the train pipe and the equalizing reservoir until the equalizing reservoir pressure acting in the piston chamber 13 on the outer face of the piston 14 has reduced to a point at which the constant pressure in chamber 27 acting on the outer face of piston 16 is sufficient to effect the movement of the pistons to the right, it being noted that the rotary valve 31 blanks the port 34 in service application position, so that fluid under pressure is bottled up in chamber 27. The movement of the pistons 14 and 16 to the right operates the valve 17 to cut off the exhaust port 32 and thereby prevent further discharge of air from the train pipe and from the equalizing reservoir. The discharge valve 11 remains open, however, until the train pipe pressure has reduced to a point slightly below that in the equalizing reservoir, and then the piston 5 operates to close the discharge valve 11. The volumes of the chamber 27 and valve chamber 25 and the relative areas of the pistons 14 and 16 are such as to cause the operation of said pistons to close the exhaust when the equalizing reservoir pressure has reduced to a predetermined degree, preferably 50 pounds.

It will now be evident that by means of my invention, the reduction of pressure in the train pipe in making a service application of the brakes takes place rapidly by venting fluid directly to the atmosphere, while at the same time, the reduction is limited to a predetermined degree. A spring may be employed to provide the constant pressure for opposing the pressure of the equalizing reservoir on the opposite side of the piston, but where a slide valve is employed it is preferable to have fluid pressure in the valve chamber in order to hold the slide valve to its seat. If, however, a spring is used, a puppet valve may be employed instead of a slide valve, as will be evident.

Having now described my invention, what I claim as new and desire to secure by Letters Patent, is:—

1. In a fluid pressure brake, the combination with a train pipe and a brake valve provided with an equalizing reservoir and an equalizing discharge valve mechanism operating upon a reduction in equalizing reservoir pressure for discharging fluid from the train pipe, of a valve device subject to the opposing pressures of the equalizing reservoir and a constant pressure for controlling the release of air from the equalizing reservoir.

2. In a fluid pressure brake, the combination with a train pipe and a brake valve provided with an equalizing reservoir and an equalizing discharge valve mechanism operating upon a reduction in equalizing reservoir pressure for discharging fluid from the train pipe, of a valve device subject to the opposing pressures of the equalizing reservoir and a constant pressure for cutting off the release of air from the equalizing reservoir upon a predetermined reduction in pressure in the equalizing reservoir.

3. In a fluid pressure brake, the combination with a train pipe and a brake valve provided with an equalizing reservoir and an equalizing discharge valve mechanism operating upon a reduction in pressure in the equalizing reservoir for venting air from the train pipe, of a valve device subject to the opposing pressures of the equalizing reservoir and a chamber constantly containing fluid under pressure for limiting the release of air from the equalizing reservoir.

4. In a fluid pressure brake, the combination with a train pipe and a brake valve provided with an equalizing reservoir and an equalizing discharge valve mechanism operating upon a reduction in pressure in the equalizing reservoir for venting air from the train pipe, of a differential piston device comprising a valve for controlling an exhaust outlet from the equalizing reservoir, and a differential piston for operating said valve having two heads, one head subject to equalizing reservoir pressure and the other head subject to the pressure of a chamber constantly charged with fluid under pressure.

5. In a fluid pressure brake, the combination with a train pipe, an equalizing reservoir, an equalizing discharge valve mechanism operating upon a redution in pressure in the equalizing reservoir for venting air from the train pipe, and a brake valve having ports adapted in service application position to release fluid from the equalizing reservoir, of a valve device comprising a differential piston having two piston heads, one piston head being subject to the pressure of the equalizing reservoir and the other to the pressure of a chamber continuously charged with fluid under pressure, and a valve controlled by said differential piston for closing communication through said ports upon a predetermined reduction in equalizing reservoir pressure.

6. In a fluid pressure brake, the combination with a train pipe and a brake valve provided with an equalizing reservoir and an equalizing discharge valve mechanism operating upon a reduction in equalizing reservoir pressure for discharging air from the train pipe and having an exhaust port for discharging air directly from the train pipe, of a valve device subject to the opposing pressures of the equalizing reservoir and a chamber continually charged with fluid under pressure for controlling the exhaust of air from the equalizing reservoir and through said direct exhaust port.

7. In a fluid pressure brake, the combination with a train pipe and a brake valve provided with an equalizing reservoir and an equalizing discharge valve mechanism operating upon a reduction in equalizing reservoir pressure for discharging air from the train pipe and having an exhaust port for discharging air directly from the train pipe, of a valve device subject to the opposing pressures of the equalizing reservoir and a chamber continually charged with fluid under pressure for controlling the exhaust of air from the equalizing reservoir and through said direct exhaust port and adapted upon a predetermined reduction in equalizing reservoir pressure to close said exhaust.

8. In a fluid pressure brake, the combination with a train pipe and a brake valve provided with an equalizing reservoir and an equalizing discharge valve mechanism operating upon a reduction in equalizing reservoir pressure for discharging air from the train pipe, of a valve device subject to the opposing pressures of the equalizing reservoir and a chamber for cutting off the release of air from the equalizing reservoir upon a predetermined reduction in equalizing reservoir pressure.

In testimony whereof I have hereunto set my hand.

WALTER V. TURNER.

Witnesses:
A. M. CLEMENTS,
B. A. OLIVER.

Copies of this patent may be obtained for five cents each, by addressing the "Commissioner of Patents, Washington, D. C."